(12) United States Patent
Fink et al.

(10) Patent No.: US 12,251,771 B2
(45) Date of Patent: Mar. 18, 2025

(54) ANVIL, ANVIL CARRIER AND ULTRASONIC WELDING DEVICE

(71) Applicant: NovaTec GmbH Innovative Technologie, Hattersheim (DE)

(72) Inventors: Daniel Fink, Rüsselsheim (DE); Markus Bingel, Nidderau (DE); Boris Skledar, Niedernhausen (DE)

(73) Assignee: NovaTec GmbH Innovative Technologie, Hattersheim (DE)

( * ) Notice: Subject to any disclaimer, the term of this patent is extended or adjusted under 35 U.S.C. 154(b) by 0 days.

(21) Appl. No.: 18/010,549

(22) PCT Filed: Jun. 15, 2021

(86) PCT No.: PCT/EP2021/066120
§ 371 (c)(1),
(2) Date: Dec. 15, 2022

(87) PCT Pub. No.: WO2021/255031
PCT Pub. Date: Dec. 23, 2021

(65) Prior Publication Data
US 2024/0217026 A1    Jul. 4, 2024

(30) Foreign Application Priority Data
Jun. 16, 2020 (EP) .................................. 20180280

(51) Int. Cl.
*B23K 20/10* (2006.01)
(52) U.S. Cl.
CPC .................................. *B23K 20/106* (2013.01)

(58) Field of Classification Search
None
See application file for complete search history.

(56) References Cited

U.S. PATENT DOCUMENTS

| 7,600,664 B2 * | 10/2009 | Dieterle | ............ | H01R 43/0207 |
| | | | | 228/110.1 |
| 8,517,078 B1 * | 8/2013 | Johnston | .............. | B23K 20/106 |
| | | | | 156/580.2 |

(Continued)

FOREIGN PATENT DOCUMENTS

| DE | 10330431 B3 | 1/2005 |
| DE | 202015008931 U1 | 3/2016 |
| DE | 102016117908 A1 | 3/2017 |

*Primary Examiner* — Devang R Patel
(74) *Attorney, Agent, or Firm* — Young Basile Hanlon & MacFarlane, P.C.

(57) ABSTRACT

The invention relates to an anvil (1) for an ultrasonic welding device (100), the anvil (1) comprising: —a working surface (2) formed on the anvil (1), on which working surface an object to be welded by means of ultrasonic vibrations is to rest; and—a bearing surface (3) formed on the anvil (1); wherein the bearing surface has two portions for the resting of the anvil (1) on a support surface formed on an anvil carrier (10); wherein the two portions at least partly include an angle in the range of 150° to 30°, 135° 45°, 135° to 95°, 95° to 45°, 120° to 60°, or 105° to 85° in an intermediate space lying between the two portions, which intermediate space lies outside of the anvil (1). The invention also relates to a corresponding anvil carrier (10) and to an ultrasonic welding device (100).

18 Claims, 5 Drawing Sheets

(56) References Cited

U.S. PATENT DOCUMENTS

| | | | |
|---|---|---|---|
| 8,695,867 B2* | 4/2014 | Khakhalev | B23K 20/10 156/580.2 |
| 8,973,246 B2* | 3/2015 | Johnston | B23K 20/10 156/580.2 |
| 2011/0284169 A1 | 11/2011 | Khakhalev | |
| 2012/0158168 A1* | 6/2012 | Khakhalev | B23K 20/24 700/108 |

* cited by examiner

ANVIL, ANVIL CARRIER AND ULTRASONIC WELDING DEVICE

CROSS REFERENCE TO RELATED APPLICATION(S)

This application claims priority to International Patent Application No. PCT/EP2021/066120, filed Jun. 15, 2021, and European Patent Application Serial No. 20180280.8, filed Jun. 16, 2020, the entire disclosures both of which are hereby incorporated by reference.

TECHNICAL FIELD

The invention described herein relates to an anvil for an ultrasonic welding device, an anvil carrier for an ultrasonic welding device and an ultrasonic welding device, and their uses for ultrasonic welding.

BACKGROUND

Well-known ultrasonic welding devices designed as welding tongs comprise an anvil interchangeably arranged on an anvil carrier. This anvil is held in a fixed position on a connecting plane between the bearing surface of the anvil and the support surface of the anvil carrier by means of a screw connection which generates a preload force acting as a normal force between a bearing surface of the anvil and the support surface of the anvil carrier. This fixation is intended to prevent longitudinal oscillations of the sonotrode in the direction of the main oscillation direction of the sonotrode, which are transmitted by the bearing surface of the anvil to the support surface of the anvil carrier, lead to relative movements between the anvil and the anvil carrier in the direction of the main oscillation direction of the sonotrode. An occurrence of such relative movements could otherwise lead to the fact that the desired ultrasonic welding process cannot be carried out reliably and local welding occurs between the anvil and the anvil carrier on the connection plane, which would prevent a separation of the anvil from the anvil carrier necessary for the maintenance-related replacement of the anvil.

The general desire for more energy-efficient electrical equipment, such as refrigerators, has led to more insulation material being incorporated into such devices, leaving less space in such devices for ultrasonic welding, such as metal tubes for example. This requires smaller ultrasonic welding equipment, especially with a more compact arrangement of anvil and anvil carrier.

In practice, it has now been found that with miniaturization of the anvil and correspondingly small screw connection between the anvil and the anvil carrier, it is not possible to generate a sufficient preload force between the anvil and the anvil carrier to ensure a reliable support of the anvil on the anvil carrier and the suppression of the unwanted relative movements between the anvil and the anvil carrier.

BRIEF DESCRIPTION OF THE INVENTION

The present invention therefore relates to the object of realizing an anvil, anvil carrier and an ultrasonic welding device that allows reliable ultrasonic welding even in smaller spaces.

This object is achieved in each case by an anvil according to independent claim 1, by an anvil carrier according to claim 10, and by an ultrasonic welding device according to claim 16. Preferred embodiments are described in the further claims and in this description.

The anvil according to the invention is an anvil for an ultrasonic welding device and comprises: a working surface formed on the anvil for resting an object to be welded by means of ultrasonic oscillations; and a bearing surface formed on the anvil; wherein the bearing surface comprises two portions for resting the anvil on a support surface formed on an anvil carrier, wherein the two portions at least partially form an angle, a, in the range of 150° to 30°, 135° to 45°, 135° to 95°, 95° to 45°, 120° to 60°, or 105° to 85°, in an intermediate space lying between the two portions, and wherein the intermediate space lies outside the anvil.

The anvil carrier according to the invention is an anvil carrier for an ultrasonic welding device and comprises: a support surface formed on the anvil carrier for supporting an anvil of the ultrasonic welding device; wherein the support surface comprises two portions, wherein the two portions at least partially form an angle, ß, in the range of 210° to 330°, 225° to 315°, 225° to 265°, 265° to 315°, 240° to 300°, or 255° to 275°, in an intermediate space lying between the two portions, wherein the intermediate space lies outside the anvil carrier.

The ultrasonic welding device according to the invention comprises: a sonotrode; an anvil carrier according to the invention; and an anvil according to the invention, wherein the anvil is interchangeably applied to the anvil carrier.

During ultrasonic welding, an anvil is tracked, usually automatically, in the direction of the sonotrode and pressed against the sonotrode in such a way that a normal force, N, acts on the part of the sonotrode on the working surface of the anvil and energy is transferred to the anvil. While ultrasonic welding is the strongest, the normal force and energy transfer to the anvil is the greatest and there is the greatest danger that the anvil will not sit stably on the anvil carrier and will carry out the unwanted movement relative to the anvil carrier.

Since the bearing surface of the anvil according to the invention comprises two portions for resting the anvil on a support surface formed on an anvil carrier, wherein the two portions at least partially form the angle α of less than 180° in an intermediate space lying between the two portions, the anvil is designed to fix itself on the support surface of the anvil carrier during ultrasonic welding, wherein the concrete values described above for angles α under 180° were determined by the inventors as particularly being favourable from a technical point of view and, in particular, lead to particularly good results with regard to self-fixation and stability. This embodiment of the anvil according to the invention results in that the normal force causes one or a plurality of restoring forces acting on the anvil that counteract one or a plurality of relative movements between the anvil and the anvil carrier. Due to the restoring forces, this self-fixing effect is even greater the more normal force or energy transfer is provided onto the anvil. In other words, the self-fixing effect is greatest exactly when it is needed most, namely when ultrasonic welding is strongest, which is particularly beneficial for reliable ultrasonic welding and the resistance of anvil and anvil carrier.

This adaptation of the anvil for self-fixation allows miniaturization of the fastening means, such as the screw described above for example, of the anvil on the anvil carrier since the self-fixing effect takes the load off the fastening means, and even allows the anvil to be reliably fixated on the anvil carrier during the ultrasonic welding process without any additional fastening means (e.g., screw). The self-fixing effect thus reduces the relative movement between the anvil and the anvil carrier in the direction of the main oscillation direction of the sonotrode during the ultrasonic welding process, particularly in the case of compact arrangements of anvil, sonotrode and anvil carrier, and enables reliable ultrasonic welding in small spaces to take place.

An additional technical advantage is that, due to the self-fixing effect, a reduction in the relative movement between the anvil and the anvil carrier in the direction transverse to the main oscillation direction of the sonotrode is achieved (less transverse movement), which makes roughening of the bearing surface and/or the support surface for the purpose of such a reduction no longer necessary.

Since the support surface of the anvil carrier comprises two portions, wherein the two portions at least partially form the described angle ß of more than 180° (for example with ß=360°−α) in an intermediate space lying between the two portions, the anvil carrier is designed to be used with the self-fixing anvil described above according to the invention and promotes the self-fixing effect described above, wherein the concrete values described above for angle ß below 180° were determined by the inventors as being particularly favourable from a technical point of view and, in particular, lead to particularly good results with regard to self-fixation and stability. The advantages described in connection with the anvil thus also apply to the anvil carrier according to the invention.

The anvil according to the invention and the anvil carrier according to the invention are thus each specially designed for use in a self-fixing system comprising an anvil and an anvil carrier, wherein the anvil according to the invention and the anvil carrier according to the invention are adapted to work together and implement complementary aspects of the same inventive idea with the technical advantages described above.

In accordance with particularly preferred aspects of this invention, an angle, δ, is formed between a plane, on which the working surface lies, and a first portion of the two portions of the bearing surface and further an angle, ε, is formed between the plane, on which the working surface lies, and a second portion of the two portions of the bearing surface. Each of the two angles δ and ε is preferably at least 15° in order to avoid a self-locking effect at the boundary surface between the bearing surface of the anvil and the support surface of the anvil carrier particularly reliably and to provide the self-fixation particularly effectively. The first portion can extend towards the back side of the anvil and the second portion can extend towards the front side of the anvil. The angle ε can preferably be 60-70° and the angle ε can preferably be 15-25° if a is in the range of 85° to 105°.

In accordance with particularly preferred aspects of this invention, a bore hole (7) for attaching an (additional) fastening means in order to compliment the attachment by means of self-fixation via a coarser fixation extends through the front side of the anvil and/or through the second portion of the bearing surface.

The fastening means can be arranged or tightened in such a way that the self-fixation is enabled by the fastening means in an unhindered manner. A bore-hole axis of the bore hole can be inclined with respect to the second portion of the bearing surface and form an angle with the second portion of the bearing surface open towards the working surface and arranged within the anvil, γ, with γ<90° in order to allow a particularly secure attachment of the anvil on the anvil carrier, in particular, thereby avoiding air gaps between the bearing surface and the support surface.

Particularly preferred aspects of this invention comprise surface structures on one or a plurality of the portions of the bearing surface and/or the support surface, which surface structures increase the friction acting between bearing surface and support surface, and, thereby, also the self-fixing effect described above. In the case of complementary surface structures on adjacent and contacting portions of the bearing surface and the support surface, a positive-locking fit between the bearing surface and the support surface, and thus between the anvil and the anvil carrier, is also possible. These optional additional features of these particularly preferred embodiments additionally reduce the above-described relative movements between the anvil and the anvil carrier parallel to the main oscillation direction of the sonotrode and/or transverse to the main oscillation direction of the sonotrode.

To the extent that this brief description of the invention describes features which are not listed in the patent claims, these features do not constitute essential features in the sense that these features are inevitably to be included in the claims to describe the invention; however, these features are particularly prominent preferred realizations of the claimed invention, can be combined with any of the claims, and can also be combined with each other as desired.

DETAILED DESCRIPTION

According to the invention, it is proposed to provide an anvil (1) for an ultrasonic welding device (100). According to the invention, it is furthermore proposed to provide an anvil carrier (10) for an ultrasonic welding device (100).

Figure 1:
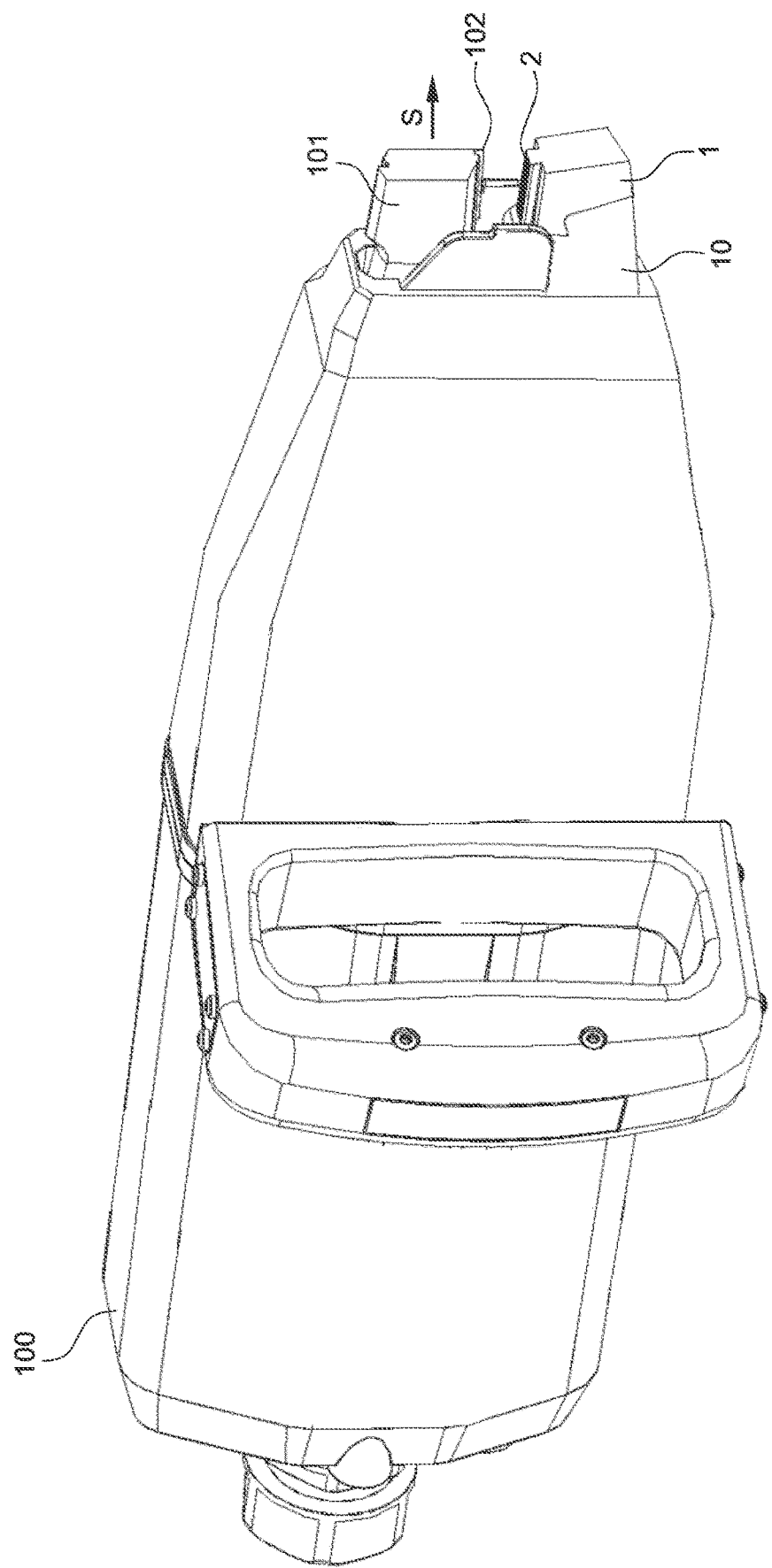
FIG. 1 shows an ultrasonic welding device according to the invention comprising an anvil according to the invention and an anvil carrier according to the invention, and a sonotrode. The figure also indicates the main direction of oscillation of the sonotrode.

FIG. 1 shows an ultrasonic welding device according to the invention (100) comprising an anvil according to the invention (1) and an anvil carrier according to the invention (10), and a sonotrode (101). The figure also indicates the main direction of oscillation (S) and the mating surface (102) of the sonotrode (101) interacting with the working surface (2) of the anvil (1).

During ultrasonic welding using the ultrasonic welding device (100), the working surface (2) can be a surface of the anvil (1) aligned towards the sonotrode (101), in particular, against the mating surface (102), of the ultrasonic welding device (100).

The ultrasonic welding device usually comprise a handle via which it can be led by the user to the space, in which the object to be welded is to be welded by means of ultrasonic welding, for example, metal tubes, The object to be welded is placed between the working surface (2) and the mating surface (102) and the anvil (1) is guided against the sonotrode (101) and pressed against it while the object is welded by means of longitudinal oscillation of the sonotrode (101) in the main oscillation direction (S) of the sonotrode. Such ultrasonic welding allows tubes to be welded so that they are fluid-tight.

Figure 2:
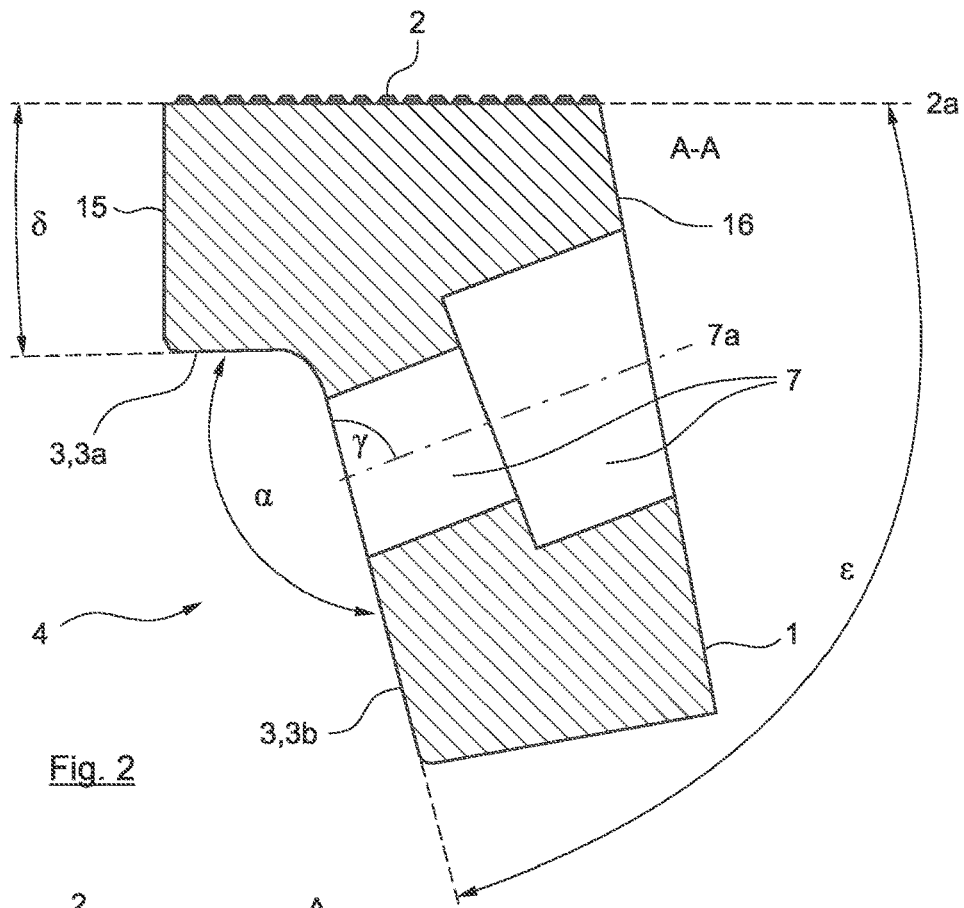
FIG. 2 shows a cross-section through an anvil according to the invention.
Figure 3:
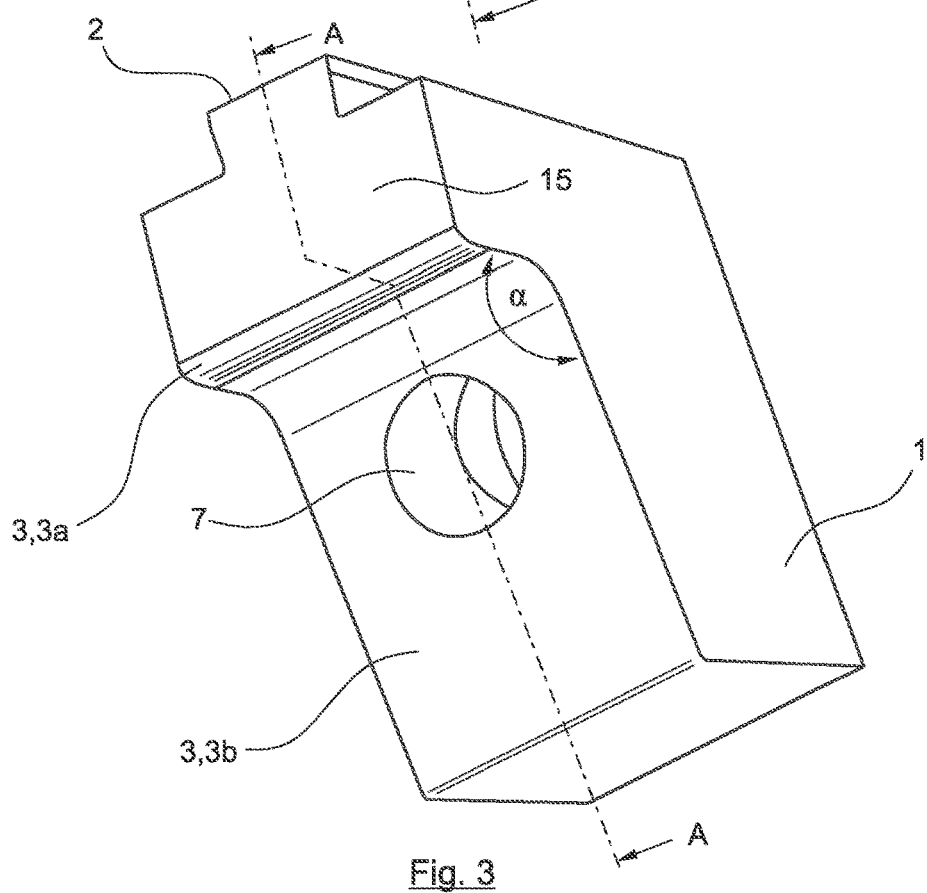
FIG. 3 shows a three-dimensional illustration of an anvil according to the invention, wherein the plane via which the cross-section in accordance with FIG. 2 is created is specified in FIG. 3.

FIG. 2 shows a cross-section through an anvil according to the invention (1). FIG. 3 shows a three-dimensional illustration of the anvil according to the invention (1), wherein the plane, via which the cross-section is created in accordance with FIG. 2, is specified in FIG. 3 with the two arrows and the dashed line.

The anvil (1) according to the invention is suitable for the ultrasonic welding device (100), and the anvil (1) comprises: a working surface (2) formed on the anvil (1) for resting an object to be welded by means of ultrasonic oscillations; and a bearing surface (3) formed on the anvil (1); wherein the bearing surface (3) comprises two portions (3a, 3b) for resting the anvil (1) on a support surface (11) formed on an anvil carrier (10), wherein the two portions (3a, 3b) at least partially form an angle (a) of less than 180°, which is particularly favourably in the range of 150° to 30°, 135° to 45°, 135° to 95°, 95° to 45°, 120° to 60°, or 105° to 85°, in an intermediate space (4) lying between the two portions (3a, 3b). The intermediate space (4) is preferably outside the anvil (1). The anvil (1) according to the invention can be combined with any of the optional features described below, as well as be combined with any number of those features.

The angle α of the anvil (1) can also have any value from X1=175° to Y1=135°, preferably any value from X2=135° to Y2=95°, any value from X3=95° to Y3=45°, or a value of less than or equal to 90°.

The bearing surface (3) is a surface of the anvil (1) that is different from the working surface (2). During ultrasonic welding using the ultrasonic welding device (100), the bearing surface (3) can be a surface of the anvil (1) facing away from the sonotrode (101) of the ultrasonic welding device (100).

Figure 4:
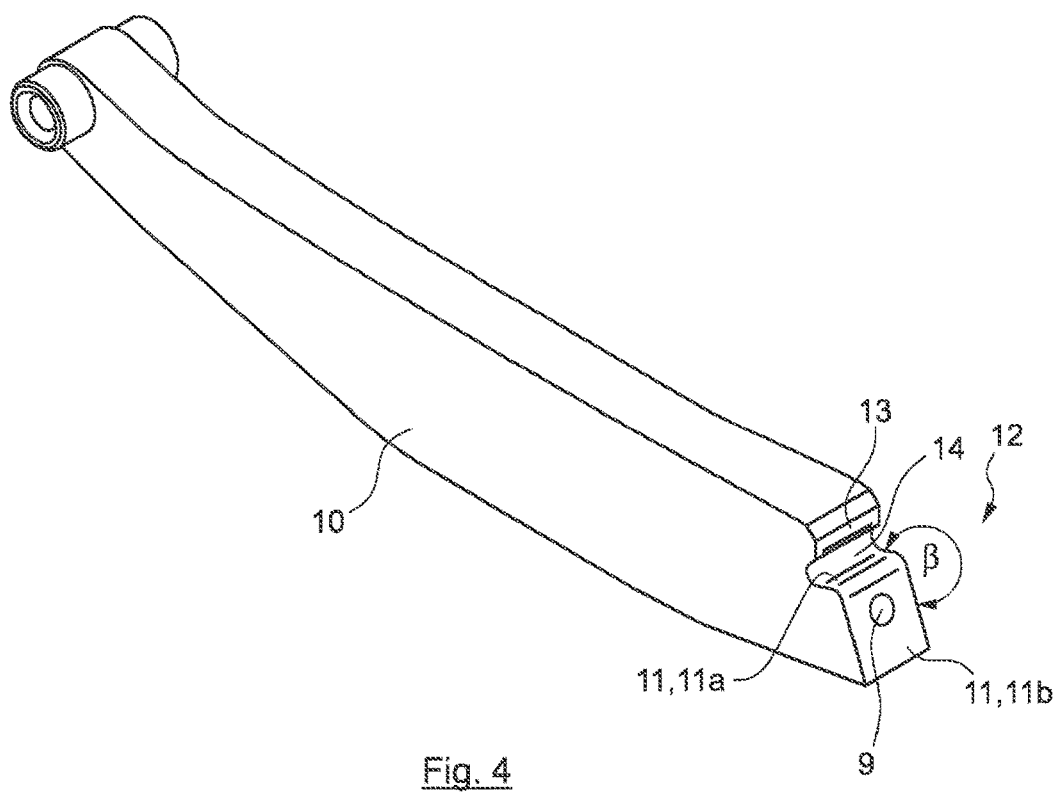
FIG. 4 shows a three-dimensional illustration of an anvil carrier according to the invention.
Figure 5:
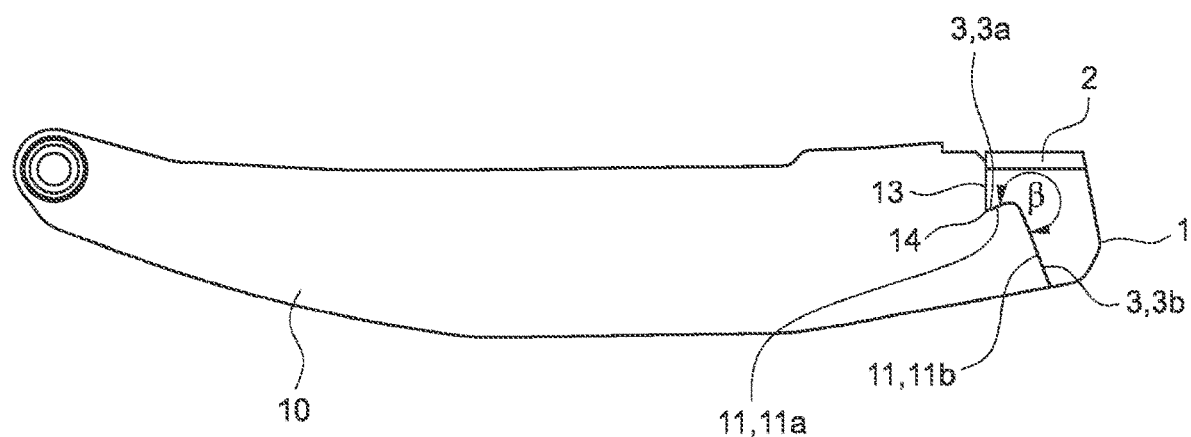
FIG. 5 shows a lateral view of an anvil carrier according to the invention and an anvil according to the invention, which is arranged on the anvil carrier according to the invention.

The intermediate space is preferably formed to receive a part of the anvil carrier (10) and its support surface (11). FIG. 4 shows an anvil carrier according to the invention (10) and FIGS. 5 to 7 show a combination according to the invention of the anvil according to the invention (1) and the anvil carrier according to the invention (10).

In precisely selecting the angle α to be below 180°, the inventors have found out that, in selecting angle α with a maximum of 150° as the upper limit, a self-locking effect opposing the restoring forces (e.g., downhill-slope force) and self-fixation (e.g., by static friction, which inhibits gliding) at the boundary surface between each of the two portions (3a, 3b) of the bearing surface (3) of the anvil and the portion (11a, 11b) of the support surface (11) of the anvil carrier supporting this respective portion (3a, 3b) can be avoided particularly reliably, since the self-locking effect is overcome on an inclined plane formed by the bearing surface and/or support surface with a gradient angle greater than about (10+/−5°). Therefore, angle α is preferably a maximum of 150° (angle ß is accordingly preferably at least 360°−150°=210°). The smaller the angle α is, the further one moves away from the undesirable possibility of a self-locking effect or can avoid it more reliably, and the greater the restoring forces (R) can become.

Figure 6:
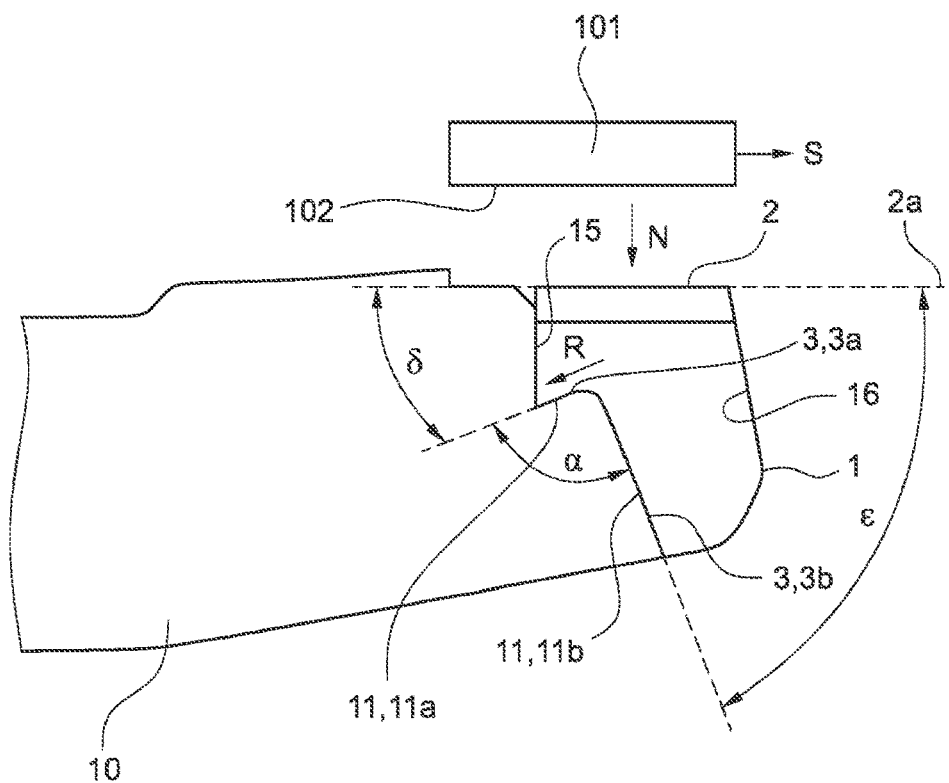
FIG. 6 shows a closer lateral view of the anvil carrier according to the invention with the anvil according to the invention arranged thereon, wherein additionally the sonotrode of the ultrasonic welding device is shown. The figure also shows the main direction of oscillation of the sonotrode, as well as the normal force and a restoring force caused by the normal force, which acts on the anvil.
Figure 7:
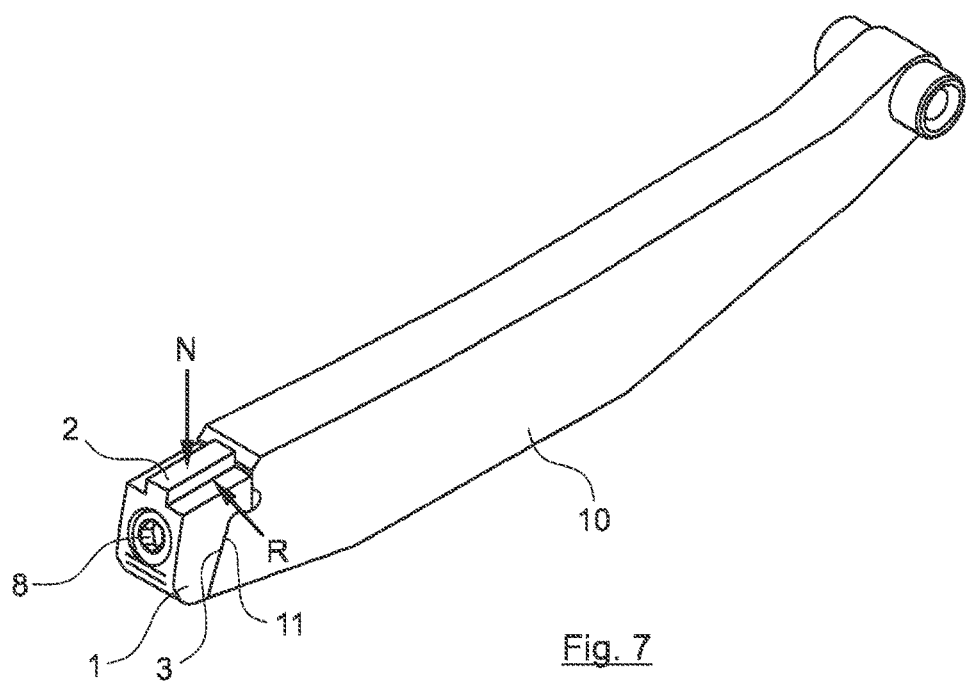
FIG. 7 shows a three-dimensional illustration of the anvil carrier according to the invention and the anvil according to the invention arranged on the anvil carrier, as well as the normal force and a restoring force acting on the anvil and caused by the normal force. Furthermore, the figure shows an optional fastening means in the form of a screw.

The inventors have determined that the angles marked in FIGS. 2 and 6 ε, δ should preferably be at least 15° in each case to avoid this self-locking effect in a particularly reliable manner. Angle δ is the angle that a plane (2a), in which the working surface (2) lies, forms with a first portion (3a) of the two portions (3a, 3b) of the bearing surface (3) of the anvil (1). Angle ε is the angle that the plane (2a), in which the working surface (2) lies, forms with a second portion (3b) of the two portions (3a, 3b) of the bearing surface (3) of the anvil (1).

The first portion (3a) can extend in the direction of the back side (15) of the anvil (1), which faces, for example, the frontal surface (13) of the anvil carrier, and the second portion (3b) can extend in the direction of the front side (16) of the anvil (1) opposite the back side (15) and facing away from it. The front side (16) can form a front surface (16) of the anvil (1) and, in the installed state, can peer into the main oscillation direction (S) of the sonotrode (101). A bore hole (7) can extend through the second portion (3b) for attaching a fastening means (8). The bore hole (7) can extend through the front side (16) of the anvil (1). The bore hole (7) can extend from and through the second portion (3B), through the anvil (1), and up to and through the front side (16). The second portion (3b) can be longer than the first portion (3a). One of the two portions (3a, 3b) of the bearing surface (3) can be at least partially linear or both of the two portions (3a, 3b) can be at least partially linear, wherein the angles α, δ, ε are preferably measured with relation to these linear regions of the portions.

Angle ε can preferably be greater than angle δ. Regardless of the size of these individual angles, the following applies: α+δ+ε=180°.

The smaller the angle α and/or the larger the angles ε, δ, the greater the restoring forces (R) described here and thus also the self-fixation, between the anvil (1) and the anvil carrier (10) at the boundary between the bearing surface (3) and the support surface (11). Angle ε can preferably be 60-70° and angle δ can preferably be 15-25° if a is in the range of 85° to 105°.

On the other hand, in precisely selecting angle α to be below 180°, the inventors have found out that, at smaller angle-a values, stability problems between the anvil (1) and the anvil carrier (10) can occur. However, a choice of angle α with at least 30° can reduce such stability problems. Such stability problems can arise, for example, by tilting the anvil (1) against the anvil carrier (10) or by breaking off material on the anvil (1) or the anvil carrier (10) at their respective tip in the region of the first portion (3a) of the bearing surface (3) and/or of the corresponding portion (11a) of the support surface (11) supporting this first portion (3a).

Furthermore, in precisely selecting angle α to be below 180°, the inventors have also found out that, by selecting the angle with at least 30°, technical conditions of the anvil and the anvil carrier can be better taken into consideration, such as the provision of sufficient space for the bore hole (7) with appropriate fastening means (8) for example. The bore hole (7) comprises a central bore-hole axis (7a) which is inclined with respect to the second portion (3b) of the bearing surface (3) and forms an angle, y´, which is open towards the working surface (3) with the second portion (3b) of the support surface (3) and located within the anvil (1), which angle is preferably less than 90° for a secure attachment of the anvil on the anvil carrier. This is shown, for example, in FIG. 2. Preferably, the angle y´ is 84° to 88° to ensure a particularly secure attachment of the anvil on the anvil carrier, in particular, thereby avoiding air gaps between the bearing surface and the support surface.

Both aspects concern the stability between anvil and anvil carrier and determine the preferred lower limits of the angle α.

Overall, the inventors have found out that, with the ranges for the values of the respective angles α, ß according to the invention, the above-described contrasting requirements and effects can be optimally balanced, thereby enabling good self-fixation with a high level of stability.

The anvil (1) can optionally comprise a bore hole (7) passing through the anvil for attaching the fastening means (8), wherein the fastening means can be a screw shown in FIG. 7 by way of example. As an alternative, pins or clamps can also be used as fastening means. The attachment by the self-fixation can therefore be complemented by means of a coarser fixation via the fastening means. The fastening means can be arranged or tightened in such a way that the self-fixation is enabled by the fastening means in an unhindered manner.

FIG. 4 shows a three-dimensional illustration of an anvil carrier according to the invention (10). FIG. 5 shows a lateral view of the anvil carrier according to the invention (10) and the anvil according to the invention (1), which is arranged on the anvil carrier according to the invention (109). FIG. 6 shows a closer lateral view of the anvil carrier according to the invention (10) with the anvil according to the invention arranged thereon (1), wherein additionally the sonotrode (101) of the ultrasonic welding device (100) is shown. FIG. 6 further shows the main direction of oscillation (S) of the sonotrode (101), as well as the normal force (N) and a restoring force (R) caused by the normal force (N) (e.g., downhill-slope force), which acts on the anvil (1).

The anvil carrier (10) according to the invention is suitable for the ultrasonic welding device (100) and comprises: a support surface (10) formed on the anvil carrier (11) for supporting an anvil (1) of the ultrasonic welding device (100); wherein the support surface (11) comprises two portions (11a, 11b), wherein the two portions (11a, 11b) at least partially form an angle (ß) of more than 180°, which is preferably in the range of 210° to 330°, 225° to 315°, 225° to 265°, 265° to 315°, 240° to 300°, or 255° to 275° (for example, β can have a value of 360°-α), in an intermediate space (12) lying between the two portions (11a, 11b). The intermediate space (12) preferably lies outside the anvil carrier (10). The anvil carrier according to the invention (10) can be combined with any and any number of the optional features described below.

One of the two portions (11a, 11b) can be designed to support the anvil (1) during ultrasonic welding using the ultrasonic welding device (100), or both of the two portions (11a, 11b) can be designed to support the anvil (1) during ultrasonic welding using the ultrasonic welding device (100). At least one of the two portions (11a, 11b) can be, during ultrasonic welding using the ultrasonic welding device (100), a surface of the anvil carrier (10) facing the sonotrode (101) of the ultrasonic welding device (100).

The intermediate space (12) can be formed to receive a part of the anvil (1) in such a way that a bearing surface (3) of the anvil (1) rests on the support surface (11).

The angle ß can also have any value from 360°-X1° to 360°-Y1°, preferably any value of 360°~X2° to 360°-Y2°, any value of 360°-X3° to 360°~Y3°, or a value greater than or equal to 270°, wherein the following applies: X1=175°, Y1=135°, X2=135°, Y2=95°, X3-95° and Y3=45°

One of the two portions (11a, 11b) can be at least partially linear, or both of the two portions (11a, 11b) can be at least partially linear.

The anvil (1) and anvil carrier (10) are each preferably designed to be used for the ultrasonic welding and (if applicable, simultaneous) cutting of metals, in particular, for fluid-tight ultrasonic welding and (if applicable, simultaneous) separation of metal tubes.

Now we make special reference to FIGS. 1, 5, and 6, as well as to FIG. 7, which have already been described. FIG. 7 shows a three-dimensional illustration of the anvil carrier (10) according to the invention and the anvil (1) arranged on the anvil carrier (10) according to the invention, as well as the normal force (N) and a restoring force (R) (e.g., adhesive or dynamic friction force) acting on the anvil (1) and caused by the normal force (N). Furthermore, the figure shows an optional fastening means (8) in the form of a screw.

The ultrasonic welding device according to the invention (100) shown as an example in FIG. 1 comprises: a sonotrode (101); any of the anvil carriers described here (10); and any of the anvils of the invention described here (1), wherein the anvil (1) is interchangeably applied to the anvil carrier (10).

The anvil (1) can be applied to the anvil carrier (10) in such a way that one of the two portions (3a, 3b) of the bearing surface (3) of the anvil (1) rests on one of the two portions (11a, 11b) of the support surface (11) of the anvil carrier (10), and the other one of the two portions (3a, 3b) of the bearing surface (3) of the anvil (1) rests on the other one of the two portions (11a, 11b) of the support surface (11) of the anvil carrier (10).

The ultrasonic welding device (100) can be designed in such a way that, when the working surface (2) of the anvil (1) is moved during ultrasonic welding using the ultrasonic welding device (100) against the mating surface (102) formed on the sonotrode (101), by means of a normal force (N) acting through the sonotrode (101) or the mating surface (102) on the working surface (2), at least one of the two portions (3a, 3b) of the bearing surface (3) is pressed on at least one of the two portions (11a, 11b) of the support surface (11).

The angle described above (a) of the anvil and/or the angle (B) of the anvil carrier described above are each preferably selected in such a way that, during ultrasonic welding, the anvil (1) can be fixated even without additional fastening means (8), such as screws, pins or clamps for example, by means of the normal force (N) acting through the sonotrode (101) of the ultrasonic welding device (100) on the anvil (1) on the support surface (11) of the anvil carrier (10) during the ultrasonic welding. While an acute angle (a) allows a greater restoring force (R) due to a greater downhill-slope force, the contact area between contact surface (3) and support surface (11) becomes more unstable. Values of a in the range of 150° to 30°, 135° to 45°, 135° to 95°, 95° to 45°, 120° to 60°, or 105° to 85° and ß=360°-α, preferably ß has values in the range of 210° to 330°, 225° to 315°, 225° to 265°, 265° to 315°, 240° to 300°, or 255° to 275°, provide particularly favourable results, wherein, preferably, the self-locking effect described above is particularly reliably avoided by selecting angles δ, ε to be at least 15° each.

The normal force (N) can cause a restoring force (R), as shown by way of example in FIG. 6, which counteracts a relative movement between the anvil (1) and the anvil carrier (10) in the main oscillation direction (S) (here the longitudinal direction) of the sonotrode (101). This restoring force (R), as exemplified in FIG. 6, comprises a downhill-slope force on the support surface (11) directed in a downhill-sloping manner and/or a (dynamic or adhesion) friction force acting between the bearing surface (3) and the support surface (11). The direction vector of the relative movement between the anvil (1) and the anvil carrier (10) can be parallel to the main direction of oscillation (S) of the sonotrode (101).

In addition, or as an alternative, the normal force (N) can cause another restoring force (R), as exemplified in FIG. 7, which counteracts a relative movement between the anvil (1) and the anvil carrier (10) perpendicular and/or transverse to the main direction of oscillation (S) of the sonotrode (101). This restoring force (R), as shown by way of example in FIG. 7, comprises a (dynamic or adhesive) friction force acting between the bearing surface (3) and the support surface (11). The direction vector of the relative motion between the anvil (1) and the anvil carrier (10) can be transverse to the main oscillation direction (S) of the sonotrode (101).

The direction vector of each of the two restoring forces (R) in accordance with FIGS. 6 and 7 can contain at least one component perpendicular to the direction vector of the normal force (N).

The direction vector of the restoring force (R) in accordance with FIG. 6 can include a component which is parallel to the direction vector of the normal force (N) and/or a component which runs parallel to the main oscillation direction (S) of the sonotrode (101).

The direction vector of each of the two restoring forces (R) in accordance with FIGS. 6 and 7 can contain at least one component which is perpendicular (sagittal in FIG. 6 and transverse in FIG. 7) to the main direction of oscillation (S) of the sonotrode (101).

The restoring force (R), as shown by way of example in FIG. 6, can comprise a downslope downhill-slope force directed on the support surface (11) in a downhill-sloping manner and/or a (dynamic or adhesive) friction force acting between the bearing surface (3) and the support surface (11). The other or further restoring force (R), as shown by way of example in FIG. 7, can comprise a (dynamic or adhesive) friction force acting between the bearing surface (3) and support surface (11).

The amount of each of the two restoring forces (R) in accordance with FIGS. 6 and 7 increases with increasing amount of normal force (N). If the normal force (N) is increased by the ultrasonic welding process, for example, because the sonotrode (101) and the anvil (1) are pressed more strongly against each other, both the downhill-slope force component of the restoring force (R), as shown by way of example in FIG. 6 (the normal force (N) has the function of a weight force on an inclined plane), as well as the dynamic and/or static friction component(s) of the restoring force (R), as shown in each of the FIGS. 6 and 7, become larger.

In the case of a more intensive ultrasonic welding process, in which a greater normal force or a greater energy transfer acts or takes place on the anvil, the anvil with its bearing surface is pressed more strongly on the support surface of the anvil carrier and pressed more strongly downhill on the inclination or inclined plane resulting from the angles described above. As illustrated by way of example in FIGS. 1, 5, 6 and 7 for angles of about α=90° and ß=270°, the first portion (11a) of the support surface (11) of the anvil carrier (10) forms such an inclination or inclined plane along the anvil (10) with its complementary or adjacent and contacting first portion (3a) of the bearing surface at a normal force (N) acting on the working surface (2) downslope along the inclination or inclined plane via a downhill-slope force induced by the normal force (N). The greater the normal force (N), for example, due to a more intensive ultrasonic welding process, the greater this downhill-slope force and the more a relative movement of the anvil (1) in the main oscillation direction (S) of the sonotrode (101) away from the anvil carrier (10) is counteracted. As the normal force (N) increases, the friction forces described above, which occur between the bearing surface (3) and the support surface (11), are increased for the restoring forces (R), as shown in FIGS. 6 and 7.

The favourable technical effects described herein are achieved in particular if the above-described inclination or inclined plane can be formed at the interface between the support surface (11) and the bearing surface (3), which is possible by relative arrangement of the portions (11a, 11b) of the support surface (11) and the portions (3a, 3b) of the bearing surface (3) each below and to each other. Such an inclination or inclined plane is regularly given when α<180° and ß>180°, wherein, preferably, the self-locking described above is particularly reliably avoided by selecting angles δ, ε of at least 15°.

A frontal surface (13) of the anvil carrier (10), which is adjacent to the back side (15) of the anvil (1) and, if applicable, should come into contact with it and which peers in the main oscillation direction (S) of the sonotrode (101), and one of the portions (11a) of the support surface (11) form a notch (14) in a part of the intermediate space (12), into which notch (14) the anvil (1) with a portion (3a) of its contact surface (3) slips down or slides back due to the downhill-slope force, when the normal force (N) acts on its working surface (2).

The above-described special embodiments of the anvil according to the invention (1) and anvil carrier (10) thereby result in a self-fixation of the anvil (1) on the anvil carrier (10) during an ultrasonic welding process.

Particularly preferred embodiments of this invention comprise surface structures on one or a plurality of the portions of the bearing surface (3) and/or the support surface (11) that increase the friction acting between bearing surface and support surface, and thus also the self-fixing effect described above.

Figure 8:
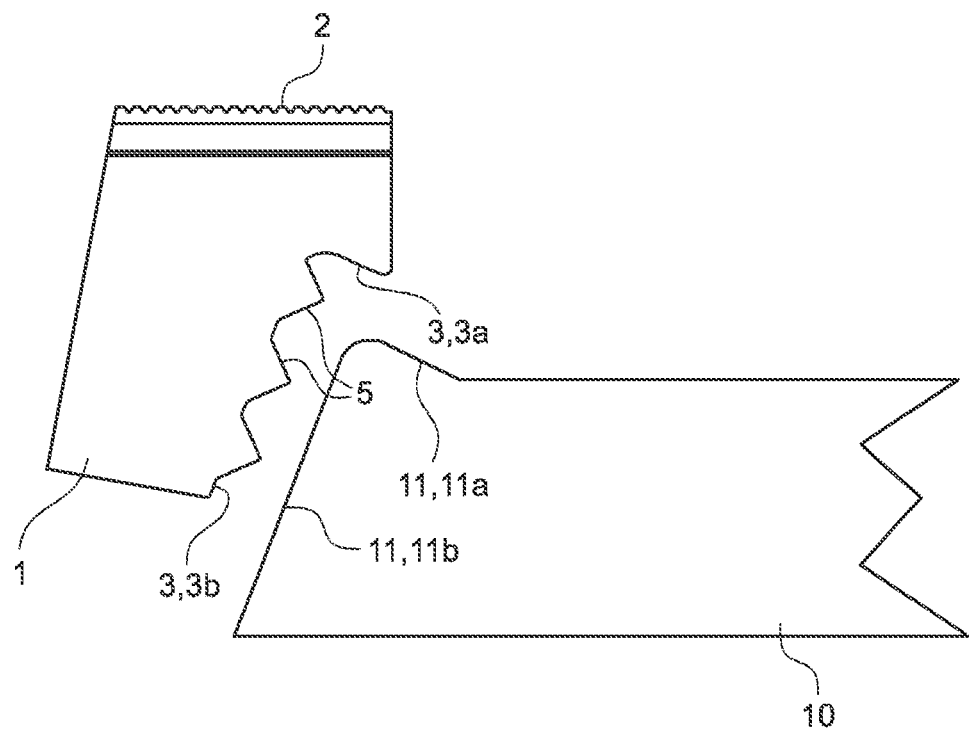
FIG. 8 shows a lateral close-up of an anvil carrier according to the invention and an anvil according to the invention, wherein the anvil comprises a surface structure on the bearing surface.

FIG. 8 shows a lateral close-up of an anvil carrier according to the invention (10) and an anvil according to the invention (1), wherein the anvil has a surface structure on the bearing surface.

The surface of one (here in FIG. 8 by way of example the second portion (3b) of the two portions (3a, 3b) can, as shown by way of example in FIG. 8, be designed with projecting spikes (5) (for example, a periodic sequence of such spikes). As an alternative, the surface of each of the two portions (3a, 3b) can be designed with such projecting spikes (5) (for example, a periodic sequence of such spikes).

Figure 9:
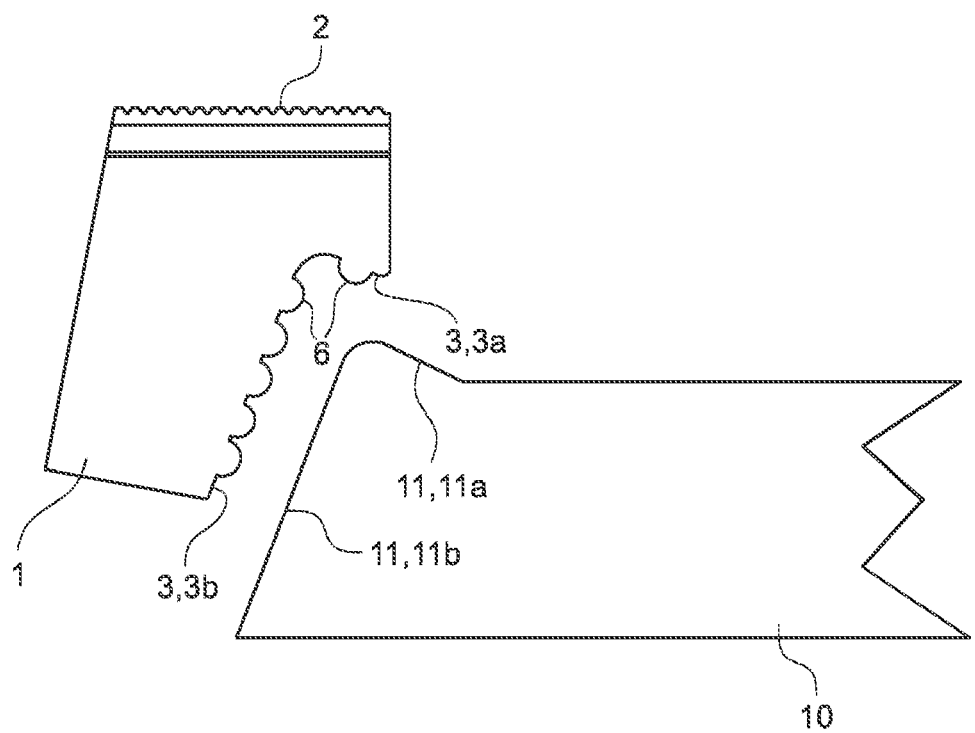
FIG. 9 shows a lateral close-up of an anvil carrier according to the invention and an anvil according to the invention, wherein the anvil comprises a different surface structure on the bearing surface.

FIG. 9 shows a lateral close-up of an anvil carrier according to the invention (10) and an anvil according to the invention (1), wherein the anvil comprises a different surface structure on the bearing surface.

The surface of one of the two portions (3a, 3b) can, as shown by way of example in FIG. 9, be designed with a projecting wave structure, for example, comprising a periodic sequence of wave crests (6). Alternatively, as shown by way of example in FIG. 9, the surface of each of the two portions (3a, 3b) can be designed with such a wave structure, for example comprising a periodic sequence of wave crests (6).

In the case of complementary surface structures (not shown here in FIGS. 8 and 9 for clarity) on adjacent and contacting portions (3a and 11a or 3b and 11b) of the bearing surface (3) and the support surface (11), a positive-locking fit between support surface (3) and support surface (11), and thus between the anvil (1) and the anvil carrier (10), is also possible.

These optional additional features of these particularly preferred embodiments reduce by increased friction or even positive-locking fit additionally the above-described relative movements between the anvil (1) and the anvil carrier (10) parallel to the main oscillation direction (S) of the sonotrode (101) and/or transversely to the main oscillation direction (S) of the sonotrode (101).

The anvil according to the invention described herein, the anvil carrier according to the invention, or the ultrasonic welding device according to the invention can be used in a particularly favourable manner for ultrasonic welding.

In the description and in the figures, preferred embodiments of the invention claimed by the enclosed claims are described. As an alternative, the invention can also be defined by the following numbered aspects:

1. An anvil (1) for an ultrasonic welding device (100), the anvil (1) comprising: a working surface (2) formed on the anvil (1) for resting an object to be welded by means of ultrasonic oscillations; and a bearing surface (3) formed on the anvil (1); characterized in that the bearing surface (3) comprises two portions (3a, 3b) for resting the anvil (1) on a support surface (11) formed on an anvil carrier (10), wherein the two portions (3a, 3b) at least partially form an angle (a) of less than 180° in an intermediate space lying between the two portions (4).

2. The anvil (1) according to Aspect 1, characterized in that the intermediate space (4) lies outside the anvil (1) or that the intermediate space (4) is formed to receive a part of the anvil carrier (10) and its support surface (11).

3. The anvil (1) according to any one of the preceding aspects, characterized in that the angle (a) has any value from X1=175° to Y1=135°, preferably any value from X2=135° to Y2=95°, more preferably any value from X3=95° to Y3=45°, or a value of less than 90°.

4. The anvil (1) according to any one of the preceding aspects, characterized in that the surface of one of the two portions (3a, 3b) is designed with projecting spikes (5) or a projecting wave structure (6), or that the surface of each of the two portions (3a, 3b) is designed with projecting spikes (5) or a projecting wave structure (6).

5. An anvil carrier (10) for an ultrasonic welding device (100), the anvil carrier (10) comprising:
a support surface (11) formed on the anvil carrier (10) for supporting an anvil (1) of the ultrasonic welding device (100);
characterized in that
the support surface (11) comprises two portions (11a, 11b), wherein the two portions (11a, 11b) at least partially form an angle (ß) of more than 180° in an intermediate space (12) lying between the two portions (11a, 11b).

6. The anvil carrier (10) according to Aspect 5, characterized in that one of the two portions (11a, 11b) is designed to support the anvil (1) during ultrasonic welding using the ultrasonic welding device (100), or that both of the two portions (11a, 11b) are designed to support the anvil (1) during ultrasonic welding using the ultrasonic welding device (100).

7. The anvil carrier (10) according to any one of the preceding Aspects 5 to 6, characterized in that the intermediate space (12) lies outside the anvil carrier (10) or that the intermediate space (12) is designed to receive a portion of the anvil (1) in such a way that a bearing surface (3) of the anvil (1) rests on the support surface (11).

8. The anvil carrier (10) according to any one of the preceding Aspects 5 to 7, characterized in that the angle (B) has any value of 360°~X1° to 360°~Y1°, preferably any value of 360°~X2° to 360°~Y2°, more preferably any value of 360°~X30 to 360°~Y3°, or a value of more than 270°, wherein X1=175°, Y1=135°, X2=135°, Y2=95°, X3=95° and Y3=45°.

9. The anvil carrier (10) according to any one of the preceding Aspects 5 to 8, characterized in that the surface of one of the two portions is designed with projecting spikes (5) or a projecting wave structure (6) or that the surface of each of the two portions is designed with projecting spikes (5) or a projecting wave structure (6).

10. The anvil (1) or the anvil carrier (10) according to any one of the preceding aspects, characterized in that the angle (a ß) is chosen in such a way that the anvil (1) can be fixated even without additional fastening means, such as screws, pins or clamps for example, by means of the normal force (N) acting through the sonotrode (101) of the ultrasonic welding device (100) during ultrasonic welding on the anvil (1) on the support surface (11) of the anvil carrier (10).

11. An ultrasonic welding device (100) comprising:
a sonotrode (101);
the anvil carrier (10) according to any one of the Aspects 5 to 10; and
the anvil (1) according to any one of the Aspects 1 to 4 or 10, wherein the anvil (1) is interchangeably applied on the anvil carrier (10).

12. The ultrasonic welding device (100) according to Aspect 11, wherein the anvil (1) is applied to the anvil carrier (10) in such a way that one of the two portions (3a, 3b) of the bearing surface (3) of the anvil (1) rests on one of the two portions (11a, 11b) of the support surface (11) of the anvil carrier (10) and the other one of the two portions (3a, 3b) of the bearing surface (3) of the anvil (1) rests on the other one of the two portions (11a, 11b) of the support surface (11) of the anvil carrier (10).

13. The ultrasonic welding device (100) according to any one of Aspects 11 to 12, wherein the ultrasonic welding device (100) is designed in such a way that, when the working surface (2) of the anvil (1) is moved during ultrasonic welding using the ultrasonic welding device (100) against a mating surface formed on the sonotrode (101) (102); by means of a normal force acting through the sonotrode (101) on the working surface (2), at least one of the two portions (3a, 3b) of the bearing surface (3) is pressed on at least one of the two portions (11*a*, 11*b*) of the support surface (11).

14. The ultrasonic welding device (100) according to Aspect 13, wherein the normal force (N) causes one or a plurality of restoring forces (R) which counteract a relative movement between the anvil (1) and the anvil carrier (10) in the main oscillation direction (S) of the sonotrode (101) and/or transverse to the main oscillation direction (S) of the sonotrode (101).

15. The ultrasonic welding device (100) according to Aspect 14, wherein the amount of one or a plurality of restoring forces (R) increases as the amount of normal force (N) increases and/or wherein one of the one or a plurality of restoring forces (R) comprise(s) a downhill-slope force on the support surface (11) directed in a downhill-sloping manner and/or wherein the one or a plurality of restoring forces (R) comprise(s) a friction force acting between the bearing surface (3) and the support surface (11).

In the description and in the figures, preferred embodiments of the invention claimed by the following claims are described. The (optional) features disclosed in the above description, claims and drawings can be used both individually as well as in any combination for implementing the invention claimed herein according to the enclosed claims in its various embodiments.

What is claimed is:

1. An anvil for an ultrasonic welding device, the anvil comprising:
    a working surface formed on the anvil for resting an object to be welded by ultrasonic oscillations; and
    a bearing surface formed on the anvil;
    wherein the bearing surface comprises two portions not parallel to each other for resting the anvil on a support surface formed on an anvil carrier;
    wherein the two portions at least partially form an angle, α, in the range of 150° to 30° in an intermediate space lying between the two portions, and wherein the intermediate space lies outside the anvil;
    wherein an angle, δ, is formed between a plane in which the working surface lies, and a first portion of the two portions of the bearing surface and an angle, ε, is formed between the plane in which the working surface lies, and a second portion of the two portions of the bearing surface; and
    wherein α+δ+ε is substantially equal to 180°.

2. The anvil according to claim 1, wherein the intermediate space is formed to receive a part of the anvil carrier and its support surface.

3. The anvil according to claim 1, wherein the angle ε is greater than the angle δ.

4. The anvil according to claim 1, wherein angle ε and angle δ are each at least 15°.

5. The anvil according to claim 1, wherein the first portion of the bearing surface extends in the direction of a back side of the anvil and the second portion of the bearing surface extends in the direction of the front side of the anvil opposite the back side and facing away from it.

6. The anvil according to claim 1, wherein a bore hole for attaching a fastening means extends through the front side of the anvil.

7. The anvil according to claim 6, wherein a bore-hole axis of the bore hole is inclined with relation to the second portion of the bearing surface and forms an angle, γ, which is open towards the working surface and arranged within the anvil, with the second portion of the bearing surface, with γ<90°.

8. The anvil according to claim 1, wherein the surface of one of the two portions is configured with projecting spikes.

9. An anvil carrier for an ultrasonic welding device, the anvil carrier comprising:
    a support surface formed on the anvil carrier;
    wherein the support surface comprises two portions not parallel to each other for supporting a bearing surface of an anvil of the ultrasonic welding device;
    wherein:
    the two portions of the support surface at least partially form an angle, β, in the range of 210° to 330° in a first intermediate space lying between the two portions of the support surface, and wherein the first intermediate space lies outside the anvil carrier;
    two portions of the bearing surface at least partially form an angle, α, in the range of 150° to 30° in a second intermediate space lying between the two portions of the bearing surface, and wherein the second intermediate space lies outside the anvil;
    an angle, δ, is formed between a plane in which a working surface of the anvil lies, and a first portion of the two portions of the bearing surface and an angle, ε, is formed between the plane in which the working surface lies, and a second portion of the two portions of the bearing surface; and
    α+δ+ε is substantially equal to 180°.

10. The anvil carrier according to claim 9, wherein one of the two portions is configured to support the anvil during ultrasonic welding using the ultrasonic welding device.

11. The anvil carrier according to claim 9, wherein the intermediate space is formed to receive a part of the anvil in such a way that a bearing surface of the anvil rests on the support surface.

12. The anvil carrier according to claim 9, wherein the surface of one of the two portions is configured with projecting spikes.

13. The anvil carrier according to claim 9, wherein the angle β is chosen in such a way that the anvil can be fixated even without additional fastening means, such as screws, pins or clamps for example, by means of the normal force acting through the sonotrode of the ultrasonic welding device during ultrasonic welding on the anvil on the support surface of the anvil carrier.

14. An ultrasonic welding device comprising:
    a sonotrode;
    an anvil;
    an anvil carrier comprising:
        a support surface formed on the anvil carrier,
        wherein the support surface comprises two portions not parallel to each other for supporting the anvil, wherein the two portions at least partially form an angle, β, in the range of 210° to 330° in a first intermediate space lying between the two portions, and wherein the first intermediate space lies outside the anvil carrier; and
    the anvil comprising:
        a working surface formed on the anvil for resting an object to be welded by ultrasonic oscillations, and
        a bearing surface formed on the anvil,
        wherein the bearing surface comprises two portions not parallel to each other for resting the anvil on a support surface formed on an anvil carrier, wherein the two portions at least partially form an angle, α, in the range of 150° to 30° in a second intermediate space lying between the two portions, wherein the second intermediate space lies outside the anvil, and wherein the anvil is interchangeably applied to the anvil carrier;

wherein an angle, $\delta$, is formed between a plane in which the working surface lies, and a first portion of the two portions of the bearing surface and an angle, $\varepsilon$, is formed between the plane in which the working surface lies, and a second portion of the two portions of the bearing surface; and wherein $\alpha+\delta+\varepsilon$ is substantially equal to 180°.

15. The ultrasonic welding device according to claim 14, wherein the anvil is applied to the anvil carrier in such a way that one of the two portions of the bearing surface of the anvil rests on one of the two portions of the support surface of the anvil carrier and the other one of the two portions of the bearing surface of the anvil rests on the other one of the two portions of the support surface of the anvil carrier.

16. The ultrasonic welding device according to claim 14, wherein the ultrasonic welding device is configured in such a way that, when the working surface of the anvil is moved during ultrasonic welding using the ultrasonic welding device against a mating surface formed on the sonotrode, by means of a normal force acting through the sonotrode on the working surface, at least one of the two portions of the bearing surface is pressed on at least one of the two portions of the support surface.

17. The ultrasonic welding device according to claim 16, wherein the normal force causes one or a plurality of restoring forces acting on the anvil that counteract a relative movement between the anvil and the anvil carrier in the main oscillation direction of the sonotrode wherein one of the one or a plurality of restoring forces comprise(s) a downhill-slope force on the support surface directed in a downhill-sloping manner.

18. A method comprising use of the ultrasonic welding device according to claim 16 for ultrasonic welding.

* * * * *